Aug. 11, 1942.  A. L. MALTMAN  2,292,533
RAILWAY BEARING
Filed May 7, 1941
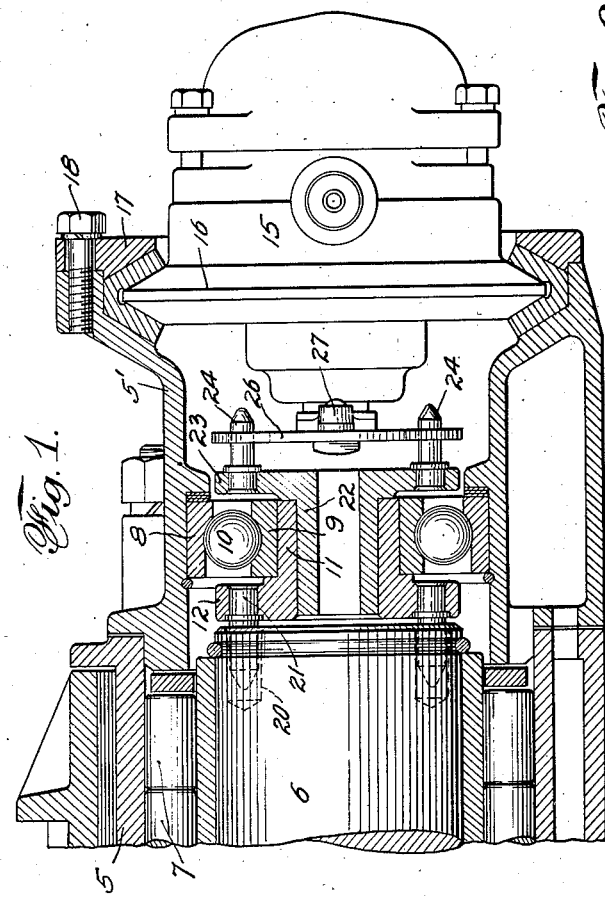
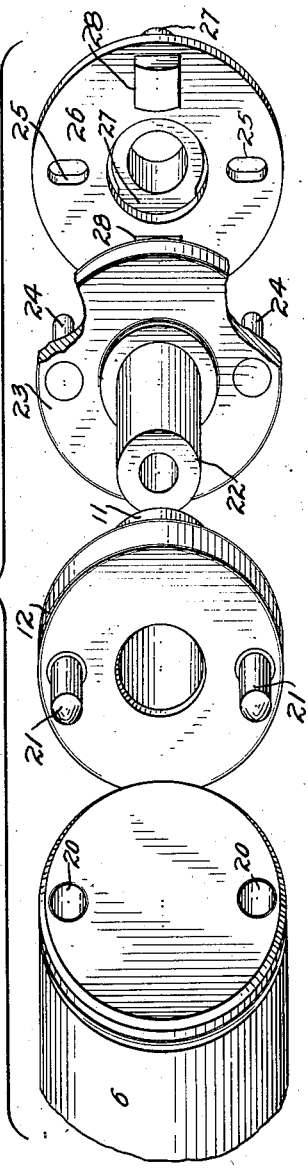
INVENTOR
ARTHUR L. MALTMAN
BY
ATTORNEYS.

Patented Aug. 11, 1942

2,292,533

UNITED STATES PATENT OFFICE 2,292,533

RAILWAY BEARING

Arthur L. Maltman, Wethersfield, Conn., assignor to The Fafnir Bearing Company, New Britain, Conn., a corporation of Connecticut Application May 7, 1941, Serial No. 392,191

10 Claims. (Cl. 64—10)

My invention relates to a railway bearing and particularly to means for driving a rotor member by the axle of such a bearing or more properly in synchronism with a wheel.

While my improved bearing means is of more or less general application in that the journal or axle may drive any desirable driven member, which is herein termed a "rotor" member, nevertheless the improved driving means is particularly advantageous in driving an inertia type of device, sometimes referred to as a "Decelostat" used in connection with the braking of trains.

It is well known that when the brakes are so forcibly applied as to cause the wheels to slip on the rails, the braking effect is substantially impaired, flats are worn on the wheels and there are other undesirable results. Inertia devices as referred to have been heretofore employed and are known in the art. Such a rotary inertia device may include a rotor driven through a spring from one end of the axle. If the axle is decelerated rapidly, for example, if the wheel starts to slip because of an excessive brake application, the inertia of the rotor will cause the speed thereof to be relatively greater than the wheel speed and electrical or mechanical apparatus will thereby be actuated, so as to automatically reduce the braking force applied to the wheel. Such rotary inertia devices are now usually carried by the axle housing and are driven directly from the axle.

It is the principal object of my invention to provide improved driving means between an axle or wheel and a rotor device.

It is a more specific object to provide an improved combined thrust bearing for an axle and driving means between the axle and a rotor device.

Other objects and features of novelty and invention will be hereinafter pointed out or will become apparent to those skilled in the art.

In the drawing which shows, for illustrative purposes only, a preferred form of the invention—

Fig. 1 is a fragmentary central vertical sectional view through a railway bearing illustrating features of the invention; and Fig. 2 is an exploded view of certain parts shown in Fig. 1.

The railway bearing herein illustrated is substantially like that shown in Hellyar Patent No. 2,155,657, April 25, 1939, to which reference is hereby made for a fuller description. Briefly, such a bearing includes an axle box or housing 5 for receiving the axle 6 and carrying the same on anti-friction bearings, such as rollers 7—7. A part of the housing, in this case the housing extension 5', carries a thrust bearing of the type disclosed in said Hellyar patent. Such a bearing includes an angular contact bearing embodying an outer bearing ring 8, an inner rotatable bearing ring 9, and interposed anti-friction bearing members, such as balls 10. A thrust member, which may be in the form of a sleeve 11, is carried by the inner bearing ring as by means of a press fit therein and preferably has thrust plate or portion 12 in position to be contacted by the end of the axle 6, whereby end thrusts of the latter will be taken by the anti-friction bearing members 10. So much of the railway bearing is disclosed in the above mentioned patent.

The present invention relates to the driving means between the car wheel or axle 6 and a rotor device, designated generally 15. Such rotor device may be a generator or other type of mechanism but, as specifically disclosed, is a "Decelostat" heretofore briefly described. The rotor device 15 may be and preferably is carried by the axle housing. In the form shown the "Decelostat" casing has a flange 16 which fits between the housing and a removable securing ring 17 secured to the housing, as by means of cap screws 18. The connections from the "Decelostat" to the brake mechanism and, in fact, the details of the "Decelostat" itself form no part of the present invention and it will suffice to say that the driven element of the "Decelostat," which may be a central shaft, is driven from the axle.

The anti-friction bearing is driven from the axle and the driven member of the "Decelostat" is driven from the axle driven bearing. The bearing and the axle are interconnected for driving, preferably by means of a pin on one of the members and a receiving hole in the other. In the form illustrated the axle has a plurality of holes, in this case two longitudinally extending holes 20—20, formed eccentrically therein. The bearing, through the thrust member or flange 12, carries longitudinally extending pins 21—21, threaded, welded or otherwise secured thereto, for loose reception in the eccentric holes 20—20. Thus, when the axle 6 rotates, the pin and hole connection will cause the rotatable member 9 of the anti-friction bearing to be rotated. The rotatable member of the anti-friction bearing is connected to the driven member of the rotor device through suitable means, preferably a pin and hole connection similar to that heretofore described.

In the form shown the rotatable member 9 of the bearing carries a sleeve member 22, which may be a press fit in the sleeve 11 of the thrust plate. The sleeve 22 may have an outwardly projecting flange 23 and the driving connection between the flange 23 and the driven member of the rotor device, as stated, is preferably in the form of a pin and hole connection. In the form illustrated the flange 23 carries a plurality of pins 24—24, threaded, welded or otherwise secured thereto, which are loosely received in radially elongated holes 25—25 in a drive plate 26. The drive plate is preferably connected to the driven member or shaft of the rotor device, as by means of an arm 27, which is loosely connected, as by means of slots 28—28 in the plate 26 and projections, so that the plate 26 together with the pin connections 24 and the arm connection 27 form, in effect, a flexible joint of more or less universal joint type, to compensate for slight inaccuracies of alignment.

It will be clear, then, that the rotatable ring 9 of the thrust bearing will be driven from the axle 6 through the pin and hole connections 20—21. The driven member of the rotor device will be driven by the rotatable member of the thrust bearing through the pin and hole connection 24—25 and the connection between the driven member of the rotor device and the driving plate 26. Thus, whether or not the axle is in thrust engagement with the thrust member 12 of the inner bearing ring, the latter will be driven by the axle and consequently the rotary movement of the axle will be transmitted to the driven member of the rotor device.

The novel construction is of extreme simplicity. There are no complicated connections or machining operations. The holes 20—20 may be drilled in the axle without even removing the axle from the axle box. The pin and hole connections are effective for driving and the assembly is very simple, requiring merely a longitudinal positioning of the pins in the holes.

While the rotor device may be conveniently carried by the axle housing, as illustrated, it is to be understood that the rotor device might be otherwise supported and could be driven through gearing or otherwise from the rotatable member of the thrust bearing.

While the invention has been described in considerable detail and a preferred form illustrated, it is to be understood that various changes and modifications may be made within the scope of the invention as defined in the appended claims.

I claim:

1. In a device of the character indicated, an axle housing, an axle therein, a rotor device carried by said housing, thrust means for said axle device including rotary thrust plate means, and means driven thereby and associated with said rotor device for driving the latter.

2. In a device of the character indicated, an axle housing, an axle therein, a rotor device carried by said housing, thrust means for said axle, said thrust means including a bearing ring mounted in said housing, a rotatable bearing ring with anti-friction bearing members interposed between said two bearing rings, means carried by said movable bearing ring and coacting with said axle for driving said movable bearing ring from said axle, and means carried by said movable bearing ring and coacting with said rotor device for driving the latter.

3. In a device of the character indicated, an axle housing, an axle therein, a rotor device, thrust means for said axle including fixed and movable bearing rings with interposed anti-friction bearing members, thrust means carried by the movable of said bearing rings and cooperable with said axle for taking thrusts of the latter, and means carried by said movable bearing ring and cooperating with said rotor device for driving the latter.

4. In a device of the character indicated, an axle housing, an axle therein, a rotor member carried by said housing, thrust means for said axle including an outer bearing ring fixedly carried by said housing, an inner bearing ring, anti-friction bearing members interposed between said rings, thrust plate means carried by said inner bearing ring and engageable with said axle for taking thrusts of the latter, driving means between said axle and thrust plate whereby said thrust plate and inner ring will be driven by said axle, and means rotatable with said inner ring and thrust plate and coacting with said rotor device for driving the latter.

5. In a device of the character indicated, an axle housing, an axle therein, a rotor device carried by said housing, thrust means including inner and outer bearing rings with interposed anti-friction bearing members, one of said rings being fixedly mounted in said housing, means carried by the other of said bearing rings for coaction with said axle for taking end thrusts thereof and for driving said other of said bearing rings, and means carried by said other of said bearing rings and coacting with said rotor device for driving the latter.

6. In a device of the character indicated, an axle housing, an axle therein, a rotor device carried by said housing, thrust means for said axle and including a rotatable thrust member, said rotatable thrust member and axle having coacting pin and hole means for driving said thrust member by said axle, and means rotatable with said thrust member and coacting with said rotor device for driving the latter.

7. In a device of the character indicated, an axle housing, an axle therein, a rotor member carried by said housing, thrust means for said axle including an outer bearing ring carried by said housing, an inner bearing ring with antifriction bearing members interposed between said rings, a thrust plate carried by said inner ring for coaction with the end of said axle for taking end thrusts thereof, said axle having a hole eccentrically formed therein, a pin carried by said thrust plate and receivable in said hole whereby said thrust plate will be driven by said axle, and means for driving said rotor member by said thrust plate.

8. In a device of the character indicated, an axle housing, an axle therein, a rotor member carried by said housing, an outer bearing ring carried by said housing beyond the end of said axle, an inner bearing ring and anti-friction bearing members interposed between said rings to form a thrust bearing, said inner ring being positioned in line with and beyond the end of said axle so as to take axle end thrusts, means between said inner ring and said axle for driving said inner ring with said axle, and means between said inner ring and rotor member for driving the latter from said inner ring.

9. In a device of the character indicated, an axle housing, an axle therein, a rotor member carried by said housing in alignment with and beyond the end of said axle, a thrust bearing between the end of said axle and said rotor member, said thrust bearing including a pair of rings with interposed anti-friction bearing members to form a thrust bearing, one of said rings carried by said housing and the other of said rings being positioned to take end thrusts of said axle, means between said axle and inner ring for driving the latter by said axle, and means between said inner ring and rotor member for driving the latter from said inner ring.

10. In a device of the character indicated, an axle housing, an axle therein, said axle housing having a detachable end section, a rotor means carried by said end section, an anti-friction bearing mounted in said end section and positioned to take axle end thrusts, said axle having a plurality of eccentric holes extending axially inward from the end, pin means associated with a movable part of said thrust bearing and detachably engageable in said holes, whereby upon rotation of said axle a movable part of said thrust bearing will be rotated, and a plurality of pins axially engageable between said movable part of said thrust bearing and said rotor device.

ARTHUR L. MALTMAN.